Dec. 17, 1957  I. R. SHEPHERD  2,816,736
SUCKER ROD CONNECTION DEVICE
Filed Feb. 25, 1955
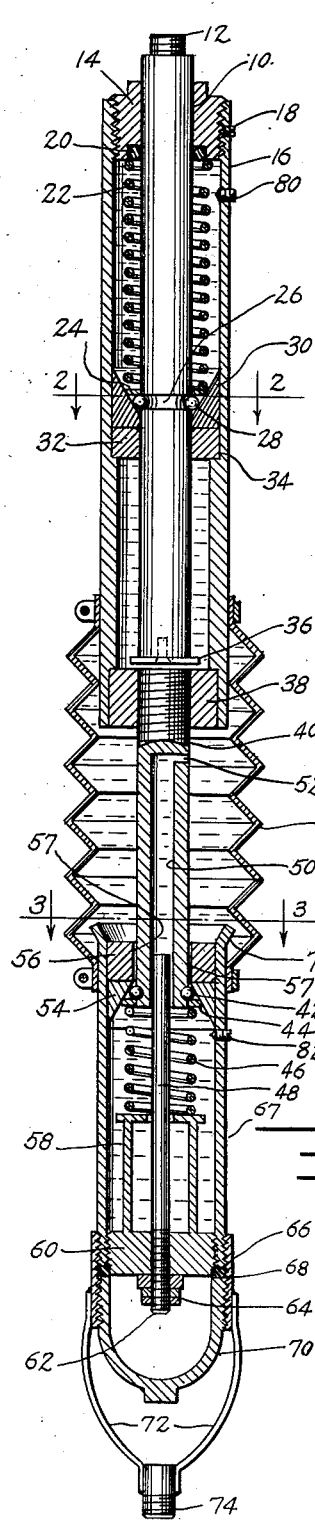
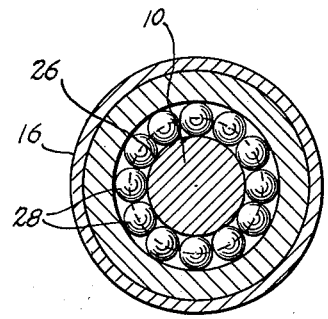
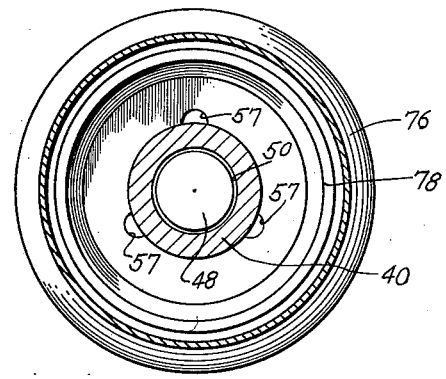
INVENTOR.
Ivan R. Shepherd
BY
McMorrow, Berman & Davidson
ATTORNEYS

2,816,736
SUCKER ROD CONNECTION DEVICE

Ivan R. Shepherd, Arnold, Nebr.

Application February 25, 1955, Serial No. 490,493

2 Claims. (Cl. 255—28)

This invention relates to an elongated, generally cylindrical assembly connectable at its opposite ends to adjacent sections of a sucker or draw rod of a pump for wells, and adapted to permit slippage or relative axial movement of said sucker rod sections under predetermined axial loading of the sucker rod exerted either upwardly or downwardly.

An object of the present invention is to provide a connection device which is adapted for attachment in conventional pump installations.

Another object of the present invention is to provide a connection device which is so designed as to enable its manufacture at low cost, relatively speaking, without sacrifice of ruggedness, strength, and trouble free operation.

Other objects will appear from the following description, the claims appended thereto, and from the annexed drawing, in which like reference characters designate like parts throughout the several views, and wherein:

Figure 1 is a longitudinal sectional view through the device;

Figure 2 is an enlarged sectional view on line 2—2 of Figure 1; and

Figure 3 is an enlarged sectional view on line 3—3 of Figure 1.

A shaft 10 has a reduced, threaded upper end 12 connectable to a section, not shown, of a sucker rod. The shaft extends through and is snugly fitted in an axial bore formed in a collar 14 which is threaded into the upper end of a cylindrical upper housing 16. A lock screw 18 interengages the collar and housing in selected positions.

At its lower end, collar 14 is formed with a shallow counterbore in which is engaged a neoprene seal ring 20.

A coiled compression spring 22 abuts at one end against collar 14, and is circumposed about the housed portion of shaft 10. At its opposite end, the spring abuts against a hold-down washer 24 slidable on shaft 10. A circumferential groove 26 of shaft 10 receives an annular series of ball elements 28 projecting partially out of the groove into engagement with a conical, upwardly facing seat 30 having an axial bore in which shaft 10 may slide, and seated on a support collar 32 also axially bored to slidably receive shaft 10. Collar 32 is supported upon a circumferential, internal shoulder 34 formed in housing 16 intermediate the opposite ends thereof.

The shaft normally projects a substantial distance within the housing below the collar 32 and at its lower end has a cross bar 36 found desirable to prevent accidental disassembly of the device prior to installation.

At its lower end, the housing 16 is counterbored to receive a circular collar 38 welded to the housing and having a threaded axial opening engaging the upper end of a lower shaft 40 axially aligned with upper shaft 10.

Lower shaft 40 extends downwardly from collar or block 38 a substantial distance, and adjacent its lower end has a circumferential groove analogous to groove 26 and receiving ball elements 42 supported against a downwardly facing conical seat 54 by washer 44 slidable on lower shaft 40. A lower compression spring 46, bearing at one end against washer 44, is circumposed about a guide rod 48 which is axially movable within a longitudinal, downwardly opening bore 50 of lower shaft 40, the inner end of which bore opens into a lateral port 52 opening upon the outer surface of shaft 40.

The conical, downwardly facing seat or bushing engaging ball elements 42 has been designated at 54, and has a flat top surface bearing against the underside of a guide block 56 fixedly attached to the upper end of a lower housing 67, the guide block having a center opening slidably receiving lower shaft 40 and communicating with circumferentiallly spaced longitudinal passages 57 of semi-circular cross section (Figure 3).

At its other end, spring 46 engages against the end wall of a spacer sleeve 58, interposed between the spring and a collar 60, the collar having a threaded opening receiving the complementarily threaded lower end 62 of guide rod 48. Lock nuts 64 are applied to end 62, and bear against collar 60. Collar 60 is adjustable, to adjust the compression on spring 46.

A gasket 66 abuts against the lower end of the lower housing 67. A connecting sleeve 68 is threaded onto the lower end of housing 67, and is also in threaded engagement with a cap 70 that is threaded into sleeve 68 into engagement with gasket 66.

Sleeve 68 is welded to circumferentially spaced, downwardly converging connecting rods 72 welded at their convergent ends to a threaded stub 74 connectable to an adjacent sucker rod section, thus connecting the entire device in the sucker rod assembly as part of said assembly.

A bellows 76 is clamped at its opposite ends to and is extended between the upper and lower housings. On the upper end of housing 67 there is formed a flared, funnel-like extension 78 disposed within the bellows.

Both housings are filled with oil, and accordingly, the upper housing 16 has a filler opening closed by a plug 80. The purpose of the oil is to assure free running of the shafts 10 and 40 as well as preservation of the interior parts.

Oil is also deposited in the lower housing through a filler opening closed by a plug 82. In this connection, guide rod 48 is somewhat smaller in diameter than the diameter of bore 50, so as to permit oil to flow upwardly within the bore 50, into the space between the guide rod and the inner end of said bore. The oil would fill the lower housing and bellows, and accordingly, whenever guide rod 48 moves upwardly within bore 50, the oil filling said bore will hydraulically cushion the movement. The pressure is relieved to an extent sufficient to permit the movement of the guide rod 48 fully to the inner end of bore 50, through the orifice 52, the oil then passing through the passages 57 back into the lower housing to flow once again upwardly past the guide rod 48 into bore 50.

In use, under normal operating conditions the entire device moves as a single unit, that is, no part of the device moves relative to any other part as long as the pump is operating normally.

However, if the sucker or draw rod below the device freezes or sticks on the upstroke, shaft 10, pulling upwardly while housing 16 is held against upward movement, lifts the ball elements 28 upwardly against the restraint of spring 22. This permits the ball elements to move out of the circumferential groove 26, and as a result, continued upward movement of shaft 10 will permit the shaft to pull through the surrounding ring of ball elements, thus permtiting shaft 10 to go into its upstroke in its usual way while the part of the sucker rod below the device remains stationary, without exertion of a corresponding heavy pull on the lower portion of the sucker rod tending to break the same due to its being frozen or stuck.

Spring 22 is adjusted as to tension by adjustable positioning of collar 14, so as to cause the shaft 10 to move axially of the housing 16 only when the load has reached a predetermined value found desirable for the particular well installation.

If the well sucker rod freezes or sticks on the down stroke, a downward pressure would be exerted by the pumping apparatus on the upper shaft 10. However, the upper shaft cannot move downwardly relative to housing 16, since the ball elements 28 are engaged in the circumferential recess 26. Therefore, housing 16 will move downwardly with shaft 10 under these circumstances.

Housing 16 is threadedly connected to lower shaft 40, and accordingly, shaft 40 is forced downwardly with housing 16 and shaft 10, overcoming the pressure of spring 46 to move ball elements 42 out of their provided groove. Shaft 40 can now continue its downward movement, while lower housing 67, connected to that portion of the sucker rod assembly that is below the device, remains stationary and is no longer under downward pressure tending to break the sucker rod during the down stroke of the pumping assembly. It is to be noted that the length of the device of the invention is such as to allow movements of the shafts 10 and 40 within the limits of the sucker rod travel.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A device to be connected between adjacent sections of a sucker rod string, for preventing breakage of said string on freezing or sticking thereof during its respective up and down strokes, comprising: an upper shaft connectable to one of said sucker rod sections; an upper housing in which said shaft is slidable; means normally engaging the shaft and upper housing against relative sliding movement during normal reciprocation of the sucker rod, but freeing the shaft for upward movement relative to the housing responsive to resistance of a predetermined value on the part of the housing to movement thereof upwardly with the upper shaft; said means comprising ball elements extending about said shaft within said housing, the shaft having a circumferential groove receiving portions of said ball elements, a seat carried by the housing and engaging portions of said ball elements projecting out of the groove, and spring means held under compression within the housing and exerting pressure against said ball elements tending to hold the same seated in the groove against said seat; a lower shaft rigid with the upper housing; a lower housing in which the lower shaft is slidable and adapted for connection to a second sucker rod section; and means normally engaging the lower shaft and lower housing against relative sliding movement, but freeing the lower shaft for downward movement relative to the lower housing responsive to resistance of a predetermined value on the part of the lower housing to movement thereof downwardly with the lower shaft; said last mentioned means comprising ball elements extending about said shaft within said lower housing, the shaft having a circumferential groove receiving the last named ball elements, a seat carried by the lower housing and engaging portions of said ball elements projecting out of said last named groove, and spring means held under compression within said lower housing exerting pressure against said last mentioned ball elements tending to hold the same seated in the last mentioned groove against said last mentioned seat.

2. A device to be connected between adjacent sections of a sucker rod string for preventing breakage of said string during movement thereof through its up and down strokes, comprising an upper shaft adapted for connection to one of the sucker rod sections; a cylindrical upper housing in which said shaft is axially slidable; means normally engaging the shaft and upper housing against relative sliding movement but freeing the shaft for upward movement relative to the housing responsive to resistance of a predetermined value on the part of the housing to movement thereof upwardly with the upper shaft, said means comprising a circumferential series of ball elements extending about said shaft within the housing, the shaft having a circumferential groove receiving portions of said ball elements, an upwardly facing, conical seat carried by the housing and engaging portions of said ball elements projecting out of the groove, a washer overlying said series of ball elements and extending about the shaft, and spring means held under compression within the housing and bearing downwardly upon said washer to hold the ball elements normally seated in said groove against the conical seat; a lower shaft rigid with the upper housing; a lower housing in which the lower shaft is slidable and adapted for connection to a second sucker rod section; and means normally engaging the lower shaft and lower housing against relative sliding movement, but freeing the lower shaft for downward movement relative to the lower housing responsive to resistance of predetermined value on the part of the lower housing to movement thereof downwardly with the lower shaft, the last named means comprising ball elements surrounding said lower shaft, said lower shaft having a circumferential groove receiving the last named ball elements, a downwardly facing, conical seat carried by the lower housing and engaging said last named ball elements, and a spring held under compression within the lower housing and exerting pressure against the last named ball elements tending to hold the same seated in their groove against the last named conical seat.

References Cited in the file of this patent

UNITED STATES PATENTS

| | | |
|---|---|---|
| 1,504,999 | Wentling | Aug. 12, 1924 |
| 1,609,189 | Philpy | Nov. 30, 1926 |
| 2,690,226 | Comstock | Sept. 28, 1954 |